United States Patent [19]
Califano et al.

[11] 3,831,382
[45] Aug. 27, 1974

[54] METHOD FOR REDUCING WATER LOSS THROUGH SOIL BY SEEPAGE

[75] Inventors: Frank L. Califano, Hackensack; George Stepien, Jr., Montclair; Thomas E. Russell, Whippany, all of N.J.

[73] Assignee: The Flintkote Company, White Plains, N.Y.

[22] Filed: Oct. 10, 1972

[21] Appl. No.: 296,114

[52] U.S. Cl.................. 61/1 R, 106/277, 260/29.6, 61/36 R
[51] Int. Cl............................ E02b 5/02, E02b 3/04
[58] Field of Search............ 61/1 R, 36 R; 260/29.6; 106/277

[56] References Cited
UNITED STATES PATENTS

| | | | |
|---|---|---|---|
| 3,236,671 | 2/1966 | Dybalski et al. | 61/36 R |
| 3,359,738 | 12/1967 | Dybalski et al. | 61/1 R |
| 3,649,574 | 3/1972 | Cole | 61/36 R |
| 3,650,113 | 3/1972 | Ferm | 61/36 R |

*Primary Examiner*—Robert R. Mackey
*Assistant Examiner*—Alexander Grosz
*Attorney, Agent, or Firm*—Curtis, Morris & Safford; Barry Evans

[57] ABSTRACT

A composition for reducing the loss of liquids by seepage through permeable ground surfaces is shown. The composition desirably comprises an aqueous emulsion of asphalt including a combination of cationic emulsifiers, a nonionic surface active agent and preferably a minor proportion of elastomer solids. The compositions are adapted for spray application on natural and man-made beds of rivers, ponds and other water impoundment and transfer structures. The stability of the emulsion is controlled so that penetration of the soil is achieved and a flexible water impervious mass is obtained.

6 Claims, No Drawings

METHOD FOR REDUCING WATER LOSS THROUGH SOIL BY SEEPAGE

This invention relates broadly to a composition and to a method for reducing the loss of aqueous liquids through permeable ground surfaces. More specifically, this invention relates to a method for reducing seepage loss of water from ponds, irrigation ditches, reservoirs, canals and other similar bodies. Even more specifically, this invention relates to a composition having the properties of a binder such that when applied by the method of this invention to ground soils or sands or rocky strata, a strong, water impermeable and flexible mass is formed.

In many areas, water is a raw material of very considerable value. Particularly in areas having little rainfall and no access to a ready supply of water, it is imperative to transport and to store water for agricultural and human consumption, without incurring a substantial loss by seepage through soils. In arid areas such as the West and Southwest areas of this country, where soils tend to be sandy and of a very porous and permeable nature, as much as 50 percent or more of available water supplies may be lost due to seepage through the base surfaces of irrigation ditches, impoundment reservoirs, canals and the like.

Several methods have been developed in the art for impermeabilizing and consolidating ground soils and naturally occurring and synthetically produced porous surfaces such as gravel layers, concrete underlayments, sand and earth masses and other like surfaces encountered in water transfer and impoundment locations. Although prior art methods have met with some success, many problems have been encountered.

One prior art method includes coating the ground surface with gunnite or similar material which is sprayed over a steel mesh and poured in a form positioned in the impoundment area. Although relatively effective from the standpoint of reduction of seepage loss, this technique is very expensive in that it requires substantial construction facilities and labor to impermeabilize a given area of ground surface. Another disadvantage of gunnite surfaces is that they are difficult to repair and where damage occurs due to earth movements, erosion or other mechanical shock, it is necessary to make extensive repairs or rebuild entire areas of the surface.

Another method used to waterproof ground surfaces involves positioning a sheet of a vinyl polymeric material over the surface to be waterproofed. This technique has several disadvantages, most notably that it is expensive to acquire and position the vinyl sheet and holes develop in the sheet due to movement of the ground and by penetration of the rocks located therein. The vinyl sheets can be repaired with difficulty especially where holes are involved. The initial and maintenance cost of vinyl sheets are therefore high.

A further technique used by workers to seal ground surfaces in water containment structures includes laying down a pavement of asphalt or other similar waterproofing material. This is an effective procedure, however, it is an expensive one. The areas to be waterproofed must be relatively large and have relatively shallow slopes to insure the proper placement of the material. Another related technique which is also relatively expensive, but is effective to reduce water seepage includes lining the irrigation canal or impoundment area with concrete. The major disadvantages encountered, in addition to the expense, are that the concrete tends to crack and site preparation and repairs entail considerable effort. Other techniques include an application of clay or plastic materials applied to the soils to form a relatively water impervious overlayer. These techniques are relatively inexpensive, but are imperfect because cracks and fissures are easily formed, and depending on water movement have a tendency to part from the soil.

One of the more recent, effective methods is that disclosed in U.S. Pat. No. 3,236,671 to Dybalski et al. In this technique, an aqueous, cationic bituminous emulsion is introduced to water contained in an impoundment or transfer structure and is permitted to settle to the bottom thereof, forming a continuous film adsorbed on the soil or sand particles on the sides and bed of the containment structure. This procedure has the merit of easy application to an existing system and it has the further advantage that the emulsion migrates to and deposits at locations where cracks, holes or fissures have developed. The major disadvantage is that very little if any penetration of the soil is obtained thereby creating a film which is essentially a surface one which is easily damaged or ruptured. In this method, there is no way of accurately calculating the amount of material needed to seal the bottom. Unless an accurate determination of the depth of fissures, cracks, etc., is available, the amount to be applied to the water surface with the assurance that all the ground surfaces are covered cannot be predicted.

It is the primary object of this invention to provide a composition for and a method for applying that composition to natural and man-made ground surfaces in water containment and transfer systems to impermeabilize them.

It is a related object of this invention to provide a composition and method for applying that composition which can be used, as a binder to waterproof different kinds of ground surfaces containing particles of varying sizes and of different compositions.

It is a further and important object of this invention to provide a composition which penetrates and combines with the ground surface to a significant degree to form a tough, flexible and water impervious mass.

It is still a further and equally important object of the present invention to provide a composition which is easily applied to a variety of natural terrains and which does not require a substantial labor force or extensive complex application equipment as do concrete, gunnite, brick lined beds, clay layers, etc. as have been used in the prior art.

It is still a further object of this invention to provide a sealant for impermeabilizing porous ground soils which is long lasting and flexible to conform to movements of ground soils and which is resistant to animal and human traffic.

It is a related and further object of this invention to provide a method for waterproofing ground surfaces which have steep slopes without requiring grading, site preparation or other preparatory operations.

It is a still further object of this invention to provide a composition which can be repaired and reinforced simply and inexpensively by reapplication of a composition over the first waterproofed layer or over any sediment or silt which forms thereover. The secondary application should combine with the initial application or loose soil to form an integral mass.

It is yet a further object of this invention to provide a composition which sets relatively quickly and which is not toxic to plant, animal or human life.

These and other objects of this invention are achieved by means of a composition which acts as a binder and penetrates and binds together the particles in permeable ground sand and soils so as to form a tough, flexible waterproofing mass. The composition, in its broadest embodiment, comprises an aqueous emulsion of a water insoluble and water dispersible bituminous material in which the bituminous material comprises from 25 to 50 percent by weight of the emulsion. The bituminous material is present in the emulsion in particles at least 90 percent of which have a size of less than about 10 microns and is kept in stable cationic emulsion by means of a combination of cationic emulsifiers comprising from approximately 0.3 percent to 1.2 percent by weight of the emulsion. The properties of the emulsion particularly its "break" characteristics are desirably modified and tailored for the purposes of this invention by inclusion of from 0.1 to 1.5 percent of the emulsion of a nonionic surface active agent. The overall composition additionally contains an acid in an amount sufficient to control the pH of the composition in the range of approximately 3 to 7.

The compositions of the invention are easily applied by spraying onto a ground surface and as described more fully hereinbelow, the composition penetrates the ground surface to a depth of as much as 4 inches or more and forms a binder which binds and consolidates into a mass the particles which comprise the ground surface. It has been found that the compositions of the invention can be applied directly to dry soils and that the waterproofing composition which is deposited forms a tough, permanent and flexible structure on steep terrain as well as flat terrain and reduces water seepage by 95 percent or more. The compositions have been found to set in as little as four hours.

In order to achieve the penetration of a substantial depth of the soil or sand in the bed and at the sides of a natural or man-made body of water, it is necessary to carefully control the "break" of the cationic emulsions in the presence of the siliceous ground material whose particles are known to have negatively charged surface characteristics. As is well known in the art of cationic bituminous emulsions, the dispersed particles of bitumen are suspended in the water by means of cationic emulsifying agents. The non-polar portion of the organic cation is readily solubilized in the particle of bitumen whereas the polar end thereof extends into the aqueous medium. The uniformity of orientation of the cationic emulsifier within the particles of bitumen creates a uniform suspension. When these particles come into contact with solid mineral surfaces, which are negatively charged, the forces of attraction contribute to a strong adsorption of the particles of bitumen on the mineral surfaces and thus lead to adhesion of bitumen and soil particles. In order to avoid a breakdown of the emulsion at the moment of contact with solid surfaces, it is important to include a mixture of cationic emulsifiers having different properties. A still further adjustment to the stability of the emulsion may be achieved by adding to it a quantity of a nonionic surface active agent. The surface active agent wets the particles of sand or soil and reduces the reactivity of them with the emulsion. The nonionic surface active agent can be deemed a coemulsifier and it performs the dual functions of wetting and activating the surfaces of the solids and modifying and suppressing the breakpoint of the cationic emulsions.

The cationic emulsifiers which are useful in the present invention may be those which are known in the art as being effective for forming stable, oil-in-water emulsions of bituminous compounds. The preferred basic emulsifiers, which may be used by themselves, although not with best results, are aliphatic amine compounds and more specifically, aliphatic diamine compounds. These compounds are typically employed in the form of a water soluble salt which is obtained by reacting the diamine with a suitable inorganic acid such as hydrochloric acid. Preferred basic emulsifiers are selected from the group consisting of N-alkyl polymethylene diamines of the formula $$R-NH(CH_2)_wNH_2$$

where $w$ is an integer of from 2 to 4 and R represents an aliphatic hydrocarbon containing from eight to 22 carbon atoms. The preferred species, marketed under the trade name DUOMEEN T by Armour Industrial Chemical Co., 110 North Wacker Drive, Chicago 6, Illinois is comprised of a tallow diamine having the formula $R-NH(CH_2)_3NH_2$.

Desirably a second cationic emulsifier is used, which can be characterized as an emulsification aid and emulsion break suppressant. It is preferably a compound selected from the group consisting of alkyl quaternary ammonium compounds of the formula

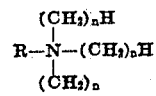

where $n$ is from 1 to 2 and R represents an aliphatic hydrocarbon containing from eight to 22 carbon atoms. An emulsification aid which has been found to have suitable properties is a tallow trimethylol ammonium chloride sold under the trademark ARQUAD S-50 by the Armour Chemical Co. The quaternary ammonium compounds, like the diamines are typically used in their salt forms.

Other compounds which may be useful to control the break stability of the emulsions are the N-alkyl polymethylene mono- and poly-alkoxylated diamines—

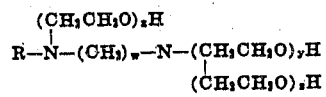

where $w$ is an integer of from 2 to 4, $x$, $y$, and $z$ are integers of from 0 to 20 and the total of $x$, $y$, and $z$ does not exceed 20.

When applying both a basic emulsifier and emulsification aid-break suppressant, it has been found that best results are obtained if the total amount of emulsifier is between 0.3 percent and 1.2 percent by weight of the emulsion. The ratio of the basic emulsifier to the emulsification aid may be in the range of from 1:2 to 2:1.

The non-ionic surface active agent performs a relatively complex function which is not entirely understood. One of its functions particularly where the soil or sand is dry, is to wet the surface of the solid particles and activate the ions inherent therein. A second function is to modify and suppress the break point of the cationic emulsion by regulating the reactivity of the bituminous emulsion-siliceous solid reaction system which is obtained when the composition is sprayed on a ground surface. A number of different nonionic surface active agents can be used, however, the preferred species are those selected from the group consisting of alkyl aryl polyether alcohols, polyethoxylated nonylphenols (average ethylene oxide content of 4–12 mols per mol of nonylphenol) benzyl ethers of octyl phenol and linear organic alcohols. Suitable commercial products are TRITON CF–10, a benzyl ether of octylphenolethylene oxide adduct, manufactured by Rohm and Haas Co., Philadelphia, Pennsylvania, NOPCOWET 160, a nonionic, alkyl aryl polyether alcohol, manufactured by Nopco Chemical Division, Diamond Shamrock Chemical Company, Newark, N.J., and HYONIC PE–90 a polyethoxylated nonylphenol containing 9 mols of ethylene oxide per mol of nonylphenol, manufactured by Diamond Shamrock Chemical Co., Morristown, N.J. As in the case with the cationic emulsifiers, the particular surface active agent chosen and the amount used may depend in part on the nature of the soil to be impermeabilized. However, it has been found that good results are obtained if the total amount of the surface active agent is from approximately 0.1 to 1.5 percent by weight of the emulsion.

It has also been found that improved results are obtained if the composition contains, in addition to the bituminous emulsion, the cationic emulsifiers and non-ionic surface active agent, an emulsified elastomeric solid such as latex in an amount of from 1 to 10 percent by weight of the emulsion. The rubber solids may have a particle size of less than about 10 microns, and are kept in emulsion by the same active components as are useful for emulsifying the bitumen. Among the commerically available rubbers which may be used to advantage in the present invention are PLIOPAVE L 165–K and NEOPRENE 950. PLIOPAVE L 165–K is the trademark of the Goodyear Tire and Rubber Co. and identifies their cationic styrene — butadiene rubber latex comprising 60 percent rubber solids. NEOPRENE 950 is the trademark of the duPont Company and identifies their cationic chloroprene rubber latex comprising 50 percent solids.

The seal obtained where the compositions contain rubber solids is tougher and more flexible than where the rubber solids are not used. Inclusion of the rubber solids is recommended in areas where earth tremors or shifts in the strata are anticipated and the flexibility of the sealant mass is more important. It has been found that if less than 1 percent by weight of rubber solids are used, the advantages in the overall composition are not realized and where more than 10 percent rubber solids are used, no substantial additional advantages are achieved.

In addition to the aforedescribed components of the composition, an acid, preferably an inorganic acid such as hydrochloric acid or phosphoric acid may be included. The amount of the acid used should correspond to that required to achieve a pH of the overall composition of from 3 to 7 or slightly less than 7 in order to establish an acidity which will insure the reactivity of the bitumen particles with the surface of the soil or sand particles which have a negatively charged characteristic. Typically the acid is used in from 0.1 to 1.0 percent of the emulsion. It has been found that best results are obtained if the pH is controlled in the range from 5 to 7.

Other modifying agents may be added to the composition to stabilize the emulsion for storage or transport. As is known, for example, minor proportions of an alkali or alkaline earth metal salt such as calcium chloride or sodium chloride may be added to lengthen the life of the emulsion. Typically these components are added in from 0.01 percent to 1.0 percent by weight of the emulsion.

The bituminous materials that may be used to form the emulsions are well known in the art. They may be selected, broadly, from water-insoluble, water-dispersible, organic thermoplastic bituminous substances that are normally solid, semi-solid or viscous liquids at ordinary atmospheric temperatures. Examples of these materials are petroleum and native asphalts, pyrogenous residues, such as blown petroleum asphalts, sludge asphalts, pressure tars and pitches. Of these materials, petroleum asphalt is most commonly used and it may be produced to the desired physical properties of softening point (Ball & Ring) from 90°F. to 200°F. and penetration from 4 dmm to 205 dmm (at 77°F.) by steam refining, by air-blowing, by solvent extraction methods, or by a combination of such methods.

Methods for forming stable emulsions of the bituminous substance in water are well known in the art. Typically, emulsions are prepared in concentrated form and contain about 65 percent solids. The emulsion of the present invention may be prepared by conventional methods as for example by first forming a solution of water, basic emulsifier, emulsification aid, acid and any other additives, together with rubber solids if any at about 120°F. This solution and molten asphalt at about 280°F. are then pumped simultaneously from separate vessels into a Charlotte Colloid Mill or other high shear pressurized mill wherein the asphalt is subjected to high shear forces and is broken up into small particles. The particle sizes in the finished emulsions may be broadly from 1 to 50 microns, but best results are obtained where 90 percent or more of the particles are less than 10 microns. Methods for forming the emulsions are extensively described in the art.

Although emulsions are typically prepared in more concentrated form, it has been found that good penetration of the surface material is obtained only where the solid content of the emulsion is in the range of 25 to 50 percent. The preferred solids concentration is 30 to 40 percent by weight.

The composition is applied to the walls and bed of water containment structures such as reservoirs, streams, ponds, irrigation ditches, canals and the like. The composition is preferably but not necessarily applied to the surface by spraying with a pole gun connected to a pump. The compositions may be applied to the surface soil in from 4 to 40 gallons per 100 square feet of surface. Desirably the spray is applied in from 10 to 20 gallons per 100 square feet of surface.

It has been found that particularly good results are obtained if the ground surface is first wet with water or preferably with a solution of nonionic surfactant in the range of 0.5 to 2.0 percent by weight of solution. Wetting the ground surface with water or surfactant solution compacts the soil particles closer to one another and prepares it advantageously for the asphalt emulsion. If a minor amount of the nonionic surface active agent is included in the water solution, the particles of sand or rock are more effectively wetted and this permits the subsequent emulsion to "wick" into the ground so that a deeper penetration is obtained. Penetrations of as much as 1 to 4 inches have been obtained with treatments following this technique. Depending on the nature of the soil to be waterproofed, it may be desirable to include a minor amount of acid in the prewetting step to further activate the negative surfaces of the siliceous ground material. Although not critical, it has been found that best results are obtained if the soil to be impermeabilized is first wet with approximately 50 to 100 gallons of water or solution per 100 square feet of surface.

The invention is further described in the following examples.

EXAMPLE I

The degree to which the compositions of this invention reduce the rate of water loss from sandy soils was determined in a series of tests using different compositions. The compositions were prepared by premixing the emulsifiers and other adjuvants in water at approximately 120°F. and pumping the solution together with molten asphalt at 280°F. to a colloid mill for emulsification. The components of the compositions are identified below.

| | |
|---|---|
| Asphalt-Binder B | Shell Oil Co. |
| 100–120 Penetration at 77°F. | |
| Soft Point R&B, 108–118°F. | |
| Ductility at 77°F. at 5 cm/min. | 100 cm (minimum) |
| Duomeen T — N alkyltrimethylene diamine | Armour & Co. |
| Arquad S-50 — N alkyl quaternary ammonium compound | Armour & Co. |
| Pliopave L-165-K — Cationic styrene-butadiene rubber latex - (60% solids) | Goodyear |
| Neoprene 950 - Cationic Chloroprene rubber latex — (50% solids) | duPont |

The compositions were applied to the surface of a sandy soil retained in 1 foot square plastic boxes. Each test box contained a 4 inch depth of test sand supported over a 1 inch layer of 1 inch stones which were separated from the sand by a 12 mesh screen. A 2 inch square hole was cut in the bottom of the box to allow for runout and the boxes were suspended above the floor so that the holes in their bottoms would not be occluded. The time of water retention for the boxes treated with the composition was compared with the time of water retention in a control box of untreated sand. The time of water retention in the control box was approximately 2 to 3 minutes whereas the sand in the boxes treated with compositions ranged from 90 to 11,520 minutes. The results are expressed both in water retention times and in terms of percentage water loss reduction. The latter figures are the more meaningful ones since it is the parameter adopted by governmental agencies to determine the effectiveness of impermeabilizing treatments.

The results achieved with a variety of compositions are set forth below in Table I.

TABLE I

| COMPOUND | Control | A | A-1 |
|---|---|---|---|
| Asphalt (Binder B) | | 5200 | 5200 |
| Water | | 2800 | 2800 |
| Duomeen T | | 16 | 32 |
| Arquad S-50 | | | |
| *HCL | | 8 | 8 |
| CaCl$_2$ | | 4 | 4 |
| Neoprene Latex 950 (50%) | | | |
| Pliolite Latex 160 (49%) | | | |
| Ucar Latex 893 (50%) | | | |
| Rhoplex Latex HA-12 (45%) | | | |
| Pliolite Latex 5352 (68%) | | | |
| Hycar Latex 1562 × 103 (41%) | | | |
| Pliopave Latex L165-K (63%) | | | |
| Emulsification | | Good | Good |
| Smoothness | | Fairly Smooth | Smooth |
| Particles | | Slight Grit | None |
| Settlement | | None | None |
| Concentration of Bituminous Solids (wgt %) | | 65% | 65% |
| Penetration | | 0.5" | 1.0–2.0" |
| Time of H$_2$O Retention (Min.) for 1 Gal. | 2¾ | 600 | 2400 |
| Percolation Rate Gals/Min. | .3636 | .00166 | .00042 |
| % Water Loss Reduction | | 99.45 | 99.89 |

| COMPOUND | A-1' | B | C |
|---|---|---|---|
| Asphalt (Binder B) | 5200 | 5200 | 5200 |
| Water | 5500 | 2800 | 10800 |
| Duomeen T | 32 | 16 | 8 |
| Arquad S-50 | | 16 | 40 |
| *HCL | 8 | 8 | 8 |
| CaCl$_2$ | 4 | 4 | 4 |
| Neoprene Latex 950 (50%) | | | |
| Pliolite Latex 160 (49%) | | | |
| Ucar Latex 893 (50%) | | | |
| Rhoplex Latex HA-12 (45%) | | | |

TABLE I —Continued

| COMPOUND | A-1' | B | C |
|---|---|---|---|
| Pliolite Latex 5352 (68%) | | | |
| Hycar Latex 1562 × 103 (41%) | | | |
| Pliopave Latex L165-K (63%) | | | |
| Emulsification | Good | Good | Good |
| Smoothness | Smooth | Very Smooth | Very Smooth |
| Particles | None | None | None |
| Settlement | None | None | None |
| Concentration of Bituminous Solids (wgt %) | 48.75% | 65% | 32.5% |
| Penetration | 0.5–1.5" | 0.5" | 1" |
| Time of $H_2O$ Retention (Min.) for 1 Gal. | 11520+ | 90 | 132 |
| Percolation Rate Gals/Min. | .000086 | .01110 | .00757 |
| % Water Loss Reduction | 99.97 | 97.00 | 97.79 |

| COMPOUND | B' | H-1 | H-1' |
|---|---|---|---|
| Asphalt (Binder B) | 5200 | 5200 | 5200 |
| Water | 10800 | 2400 | 10800 |
| Duomeen T | 16 | 16 | 16 |
| Arquad S-50 | 16 | | |
| *HCL | 8 | 8 | 8 |
| $CaCl_2$ | 4 | 4 | 4 |
| Neoprene Latex 950 (50%) | | 800 | 800 |
| Pliolite Latex 160 (49%) | | | |
| Ucar Latex 893 (50%) | | | |
| Rhoplex Latex HA-12 (45%) | | | |
| Pliolite Latex 5352 (68%) | | | |
| Hycar Latex 1562 × 103 (41%) | | | |
| Pliopave Latex L165-K (63%) | | | |
| Emulsification | Good | Good | Good |
| Smoothness | Very Smooth | Fairly Smooth | Fairly Smooth |
| Particles | None | Slight Grit | Slight Grit |
| Settlement | None | None | None |
| Concentration of Bituminous Solids (wgt %) | 32.5% | 65% | 31% |
| Penetration | 1" | 0.5" | 0.5" |
| Time of $H_2O$ Retention (Min.) for 1 Gal. | 90 | 260 | 150 |
| Percolation Rate Gals/Min. | .01110 | .00384 | .00666 |
| % Water Loss Reduction | 97.00 | 98.95 | 98.07 |

| COMPOUND | H-1a | H-1b | H-2 |
|---|---|---|---|
| Asphalt (Binder B) | 5200 | 5200 | 5200 |
| Water | 2560 | 2560 | 2384 |
| Duomeen T | 32 | 32 | 16 |
| Arquad S-50 | | 16 | |
| *HCL | 8 | 8 | 8 |
| $CaCl_2$ | 4 | 4 | 4 |
| Neoprene Latex 950 (50%) | 480 | 480 | |
| Pliolite Latex 160 (49%) | | | 816 |
| Ucar Latex 893 (50%) | | | |
| Rhoplex Latex HA-12 (45%) | | | |
| Pliolite Latex 5352 (68%) | | | |
| Hycar Latex 1562 × 103 (41%) | | | |
| Pliopave Latex L165-K (63%) | | | |
| Emulsification | Good | Good | N.G. |
| Smoothness | Smooth | Smooth | |
| Particles | None | None | |
| Settlement | None | None | |
| Concentration of Bituminous Solids (wgt %) | | | |
| Penetration | | | |
| Time of $H_2O$ Retention (Min.) for 1 Gal. | | | |
| Percolation Rate Gals/Min. | | | |
| % Water Loss Reduction | | | |

| COMPOUND | H-3 | H-4 | H-4a |
|---|---|---|---|
| Asphalt (Binder B) | 5200 | 5200 | 5200 |
| Water | 2400 | 2312 | 2518 |
| Duomeen T | 24 | 16 | 24 |
| Arquad S-50 | | | 16 |
| *HCL | 8 | 8 | 8 |
| $CaCl_2$ | 4 | 4 | 4 |
| Neoprene Latex 950 (50%) | | | |
| Pliolite Latex 160 (49%) | | | |
| Ucar Latex 893 (50%) | 800 | | |
| Rhoplex Latex HA-12 (45%) | | 888 | 533 |
| Pliolite Latex 5352 (68%) | | | |
| Hycar Latex 1562 × 103 (41%) | | | |
| Pliopave Latex L165-K (63%) | | | |
| Emulsification | Poor | N.G. | N.G. |
| Smoothness | | | |
| Particles | | | |
| Settlement | | | |

TABLE I—Continued

| COMPOUND | H-3 | H-4 | H-4a |
|---|---|---|---|
| Concentration of Bituminous Solids (wgt %) | | | |
| Penetration | | | |
| Time of H$_2$O Retention (Min.) for 1 Gal. | | | |
| Percolation Rate Gals/Min. | | | |
| % Water Loss Reduction | | | |

| COMPOUND | H-5 | H-6 | H-7 |
|---|---|---|---|
| Asphalt (Binder B) | 5200 | 5200 | 5200 |
| Water | 2614 | 2224 | 2560 |
| Duomeen T | 16 | 16 | 24 |
| Arquad S-50 | | | 16 |
| *HCL | 8 | 8 | 8 |
| CaCl$_2$ | 4 | 4 | 4 |
| Neoprene Latex 950 (50%) | | | |
| Pliolite Latex 160 (49%) | | | |
| Ucar Latex 893 (50%) | | | |
| Rhoplex Latex HA-12 (45%) | | | |
| Pliolite Latex 5352 (68%) | 584 | | |
| Hycar Latex 1562 × 103 (41%) | | 976 | |
| Pliopave Latex L165-K (63%) | | | 640 |
| Emulsification | N.G. | N.G. | Good |
| Smoothness | | | |
| Particles | | | Some Grit |
| Settlement | | | |
| Concentration of Bituminous Solids (wgt %) | | | 62% |
| Penetration | | | 1" |
| Time of H$_2$O Retention (Min.) for 1 Gal. | | | 1320 |
| Percolation Rate Gals/Min. | | | .00075 |
| % Water Loss Reduction | | | 99.72 |

| COMPOUND | H-8 | H-9 | H-10 |
|---|---|---|---|
| Asphalt (Binder B) | 5200 | 5200 | 5200 |
| Water | 2320 | 2560 | 2652 |
| Duomeen T | 24 | 16 | 16 |
| Arquad S-50 | 16 | 16 | 16 |
| *HCL | 8 | 8 | 8 |
| CaCl$_2$ | 4 | 4 | 4 |
| Neoprene Latex 950 (50%) | | 480 | |
| Pliolite Latex 160 (49%) | | | |
| Ucar Latex 893 (50%) | | | |
| Rhoplex Latex HA-12 (45%) | | | |
| Pliolite Latex 5352 (68%) | | | |
| Hycar Latex 1562 × 103 (41%) | | | |
| Pliopave Latex L165-K (63%) | 1280 | | 384 |
| Emulsification | Poor | Good | Good |
| Smoothness | | Smooth | Smooth |
| Particles | | None | None |
| Settlement | | None | None |
| Concentration of Bituminous Solids (wgt %) | | 63% | 63% |
| Penetration | | 0.5–1.0" | 0.5" |
| Time of H$_2$O Retention (Min.) for 1 Gal. | | 600 | 11520 |
| Percolation Rate Gals/Min. | | .00166 | .000086 |
| % Water Loss Reduction | | 99.45 | 99.97 |

| COMPOUND | H-9' | H-10' |
|---|---|---|
| Asphalt (Binder B) | 5200 | 5200 |
| Water | 5400 | 5500 |
| Duomeen T | 16 | 16 |
| Arquad S-50 | 16 | 16 |
| *HCL | 8 | 8 |
| CaCl$_2$ | 4 | 4 |
| Neoprene Latex 950 (50%) | 480 | |
| Pliolite Latex 160 (49%) | | |
| Ucar Latex 893 (50%) | | |
| Phoplex Latex HA-12 (45%) | | |
| Pliolite Latex 5352 (68%) | | |
| Hycar Latex 1562 × 103 (41%) | | |
| Pliopave Latex L165-K (63%) | | 384 |
| Emulsification | Good | Good |
| Smoothness | Smooth | Smooth |
| Particles | None | None |
| Settlement | None | None |
| Concentration of Bituminous Solids (wgt %) | 47% | 47% |
| Penetration | 0.5–0.75" | 0.75–1.50" |
| Time of H$_2$O Retention (Min.) for 1 Gal. | 1320 | 2880 |
| Percolation Rate Gals/Min. | .00075 | .00034 |
| % Water Loss Reduction | 99.72 | 99.89 |

EXAMPLE II

A field of application of the composition and method was conducted in Pauma Valley, California. A composition was formed by combining three parts of a concentrated cationic emulsion with one part of a relatively dilute emulsion of latex solids in water. The concentrated asphalt emulsion had the following composition:

Example:

| Component A | % by weight |
|---|---|
| Asphalt (Binder B) | 64.58 |
| Water | 34.80 |
| Duomeen T | .29 |
| Arquad S-50 | .19 |
| HCl | .095 |
| CaCl₂ | .045 |
| | 100.00 |

The rubber emulsion had the following composition:

| Component B | % by weight |
|---|---|
| Pliopave 165-K Latex (Solids) | 6.56 |
| Water (including H₂O from Latex) | 92.60 |
| Duomeen T | .40 |
| Arquad S-50 | .26 |
| HCl | .11 |
| CaCl₂ | .07 |
| | 100.00 |

The mixed composition had the following total concentration of the several constitutents:

| Mixed Composition | | % by weight |
|---|---|---|
| Asphalt (Binder B) | 195 | 48.57 |
| Pliopave 165-K (solids) 6.56 | 1.63 | |
| Water | 197.60 | 49.10 |
| Duomeen T | 1.30 | .32 |
| Arquad S-50 | .86 | .21 |
| HCl | .41 | .12 |
| CaCl₂ | .22 | .05 |
| | 401.95 | 100.00 |

The mixed composition was applied to the dry base and side surfaces of an empty pond having a surface area of approximately 15,000 square feet. The composition was applied in approximately 8 gallons per 100 square feet of ground surface area. The soil particles were substantially impermeabilized although the penetration of the material was less than 1½ inch. After the materials had set, water was impounded in the pond during a 48 hour period and water loss tests were conducted. Inventory data was taken to determine the degree of water loss reduction. It was found that approximately 85 to 86 percent water loss reduction was achieved.

After the water loss reduction tests were terminated, the pond was drained. It was found that the surfaces of the bed and sides were covered with a continuous, non-tacky layer of asphaltic material, which was firm and resilient. The vertical sidewalls shows no signs of sliding or cracking and rocks and boulders were bound into the mass as well as the smaller particles. Examination of the pond surfaces showed that although the penetrations in some places were only one half inch, it was possible to walk upon the impermeabilized area without disturbing the surface or damaging it.

After a 3 month period the pond was drained and a second application of compositions (as described below) was made to the surface which had accumulated a coating of loose sand during the service period.

The first part of this second application consisted of spraying the following composition at a rate of 3.3 gallons per hundred square feet:

| | % by weight |
|---|---|
| Pliopave 165-K Latex (solids) | 6.56 |
| Water (including water from latex | 91.60 |
| Duomeen T | .40 |
| Arquad S-50 | .26 |
| HCl | .11 |
| CaCl₂ | .07 |
| Nopcowet 160 | 1.00 |
| | 100.00 |

The second part of this second application consisted of spraying the following composition at a rate of 2.4 gallons per hundred square feet:

| | % by weight |
|---|---|
| Asphalt (Binder) | 48.57 |
| Pliopave 165-K (solids) | 1.63 |
| Water (including water from latex) | 47.60 |
| Duomeen T | 0.32 |
| Arquad S-50 | 0.21 |
| HCl | 0.12 |
| CaCl₂ | 0.05 |
| Nopcowet 160 | 1.50 |
| | 100.00 |

After cure the pond was filled with water and the water loss was measured over a period of time and it was found that the composition had reduced the water loss by 98.8 percent.

EXAMPLE III

An application of a composition, by a method of this invention was conducted in a second natural location in Pauma Valley, Calif. A pond site was cleared having dimensions of approximately 30 feet by 40 feet by 6 feet deep at the center (approximately 13,000 gallons capacity). The surfaces of the bed and the sides of the pond site were treated first with a solution of latex binder having the following composition:

| | % by weight |
|---|---|
| Pliopave 165-K Latex (solids) | 6.56 |
| Water (including H₂O from Latex) | 91.60 |
| Duomeen T | .40 |
| Arquad S-50 | .26 |
| HCl | .11 |
| CaCl₂ | .07 |
| Nopcowet 160 | 1.00 |
| | 100.00 |

The solution was applied at the rate of approximately 1 gallon per hundred square feet of surface. Thereafter the surfaces were treated with an emulsion sealer having the following composition:

| | % by weight |
|---|---|
| Asphalt (Binder B) | 48.57 |
| Pliopave 165-K (Solids) | 1.63 |
| Water | 47.60 |
| Duomeen T | .32 |
| Arquad S-50 | .21 |
| HCl | .12 |
| CaCl₂ | .05 |
| Nopcowet 160 | 1.50 |
| | 100.00 |

The solution was applied at the rate of approximately 3.3 gallons per hundred square feet of surface. Penetration of the virgin soil by both the latex solution and the final emulsion sealer was excellent. The latex solution was applied in approximately 1 gallon per hundred square feet of surface and the emulsion sealer in approximately 3.3 gallons per hundred square feet of surface. The sealing of approximately 2,300 square feet of surface area was completed in 90 minutes.

After cure, this pond was filled with water and the water loss was measured over a period of time and it was found that the treatment had reduced the water loss by 96.6 percent.

EXAMPLE IV

Tests were carried out to determine the efficacy of including minor amounts of various non-ionic surfactants in the compositions to improve soil penetration and decrease soak-in time.

An emulsion having the mixed composition described in Example II and having in addition, 0.5 percent of surfactant, was used in concentrated form (52 percent asphalt solids) and in dilute form (26 percent asphalt solids), 50 ml. of each emulsion was applied to a 4 sq. in. × ½ inch deep area (confined in an aluminum form) set on the surface of the sand in an 8 inch × 8 inch × 1½ inch deep disposable aluminum baking pan. Soak-in time and penetration data were recorded as set forth in the following Table II. It can be seen that best results are obtained with Nopcowet 160, an alkyl aryl polyether alcohol, Hyonic PE-90, a polyethoxylated nonylphenol, Triton CF-10, a benzylether of octylphenol-ethylene oxide adduct or Tergitol TMN or 15–S-7, a linear alcohol.

TABLE II

| Emulsion | % Solids (by weight) | Surfactant |
|---|---|---|
| Control | 52 | None |
| Control' | 26 | None |
| 1 | 52 | Hyonic PE90 (polyethoxylated Nonylphenol) |
| 1' | 26 | do |
| 2 | 52 | Lomar D (polymerized Naphthalene Sulfonate) |
| 2' | 26 | do. |
| 3 | 52 | Lomar PW Sodium Neutralized (Naphthalene Sulfonic Acid) |
| 3' | 26 | do. |
| 4 | 52 | Nopcowet 160 (alkyl aryl polyether alcohol) |
| 4' | 26 | do. |
| 5 | 52 | Nopcowet 1529 |
| 5' | 26 | do. |
| 6 | 52 | Tergitol TMN (Trimethyl Nonanol) |
| 6' | 26 | do. |
| 7 | 52 | Tergitol 15-S-7 (Linear Alcohol) |
| 7' | 26 | Tergitol 15-S-7 (Linear Alcohol) |
| 8 | 52 | Silicone Y-4186 (Silicone) |
| 8' | 26 | do. |
| 9 | 52 | Triton CF-10 (Benzylether of octylphenolethylene oxide) |
| 9' | 26 | do. |
| 10 | 52 | Triton X-100 (Octyl phenoxy ethanol) |
| 10' | 26 | do. |
| 11 | 52 | Triton X-114 (octyl phenoxy polyethoxy ethanol) |
| 11' | 26 | do |
| 12 | 52 | Triton X-400 (Stearyl dimethylbenzyl – ammonium chloride + stearyl and isopropyl alcohols) |
| 12' | 26 | do. |

TABLE II – Continued

| Emulsion | soak-In Time (If Rapid) | Depth of Penetration |
|---|---|---|
| Control | — | None |
| Control' | 60 min. | ¼" |
| 1 | 180 min. | ¼" |
| 1' | 360 min. | ½" |
| 2 | — | None |
| 2' | — | None |
| 3 | — | None |
| 3' | — | None |
| 4 | 180 min. | ¼" |
| 4' | 8 min. | 1" |
| 5 | — | None |
| 5' | 60 min. | ½"–1" |
| 6 | — | None |
| 6' | 5 min. | ½"–1½" |
| 7 | — | None |
| 7' | 360 min. | ½"–1½" |
| 8 | — | None |
| 8' | 360 min. | ¼"–1" |
| 9 | — | None |
| 9' | >360 min. | ¼" |
| 10 | — | None |
| 10' | >360 min. | ⅛"–¼" |
| 11 | — | None |
| 11' | 32 min | ⅛"–178" |
| 12 | — | None |
| 12' | >360 min. | ⅛"–½" |

What is claimed is:

1. A process for reducing the loss of water by seepage through permeable ground surface of water containment bodies such as reservoirs, ponds, canals and the like, comprising the step of penetrating a surface layer of said containment body with a composition comprising:

a. a 25 to 50 percent by weight aqueous, cationic emulsion of a petroleum asphalt having a softening point of 90°F. to 200°F. and a penetration at 77°F. of from 4 dmm to 205 dmm, 90 percent of the particles of asphalt being less than about 10 microns in size;

b. a mixture of at least two cationic emulsifiers in from 0.3 to 1.2 percent by weight of said emulsion, said emulsifiers including 1. a basic emulsifier selected from the group consisting of N-alkyl polyethylene diamines of the formula $R-NH(CH_2)_w NH_2$ where $w$ is an integer of from 2 to 4 and R represents an aliphatic hydrocarbon containing from eight to 22 carbon atoms; and 2. an emulsification aid-break suppressant selected from the group consisting of alkyl quaternary ammonium compounds of the formula

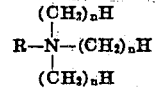

where $n$ is from 1 to 2 and R represents an aliphatic hydrocarbon containing from eight to 22 carbon atoms, said basic emulsifier and said emulsification aid-break suppressant being present in a weight ratio to one another of from 1:2 to 2:1;

c. a non-ionic surface active agent in from 0.1 to 1.5 percent by weight of said emulsion selected from the group consisting of alkyl aryl polyether alcohols, polyethoxylated nonylphenols (average ethylene oxide content of 4–12 mols per mol of nonylphenol), benzyl ethers of octyl phenol and linear organic alcohols;

d. from 1 to 10 percent by weight of said emulsion of an elastomeric material; and e. an acid in sufficient quantity to set the pH of said composition at from 3 to 7, and thereby forming a tough, flexible water-impervious mass in combination with the materials in the said surface layer.

2. A process as recited in claim 1 wherein the surface layer of said water containment body is first wetted with water to activate the surfaces of the materials therein and then penetrated with said composition.

3. A process as recited in claim 1 wherein the surface layer of said water containment body is first wetted with water containing said non-ionic surface active agent in an amount sufficient to wet the surfaces of the particles in said surface layer and then penetrated with said composition.

4. A process as recited in claim 3 wherein the solution used to pre-wet said surface layer contains from 1 percent to 10 percent by weight of an emulsion of said elastomeric material.

5. A process as recited in claim 4 wherein said surface layer is first wetted with from 50 to 150 gallons of solution per 100 square feet of surface.

6. A process as recited in claim 1 wherein said composition is applied to the surface layer in from 4 to 40 gallons per 100 square feet.

* * * * *